(12) United States Patent
Glover et al.

(10) Patent No.: US 6,173,127 B1
(45) Date of Patent: Jan. 9, 2001

(54) SPECIAL EFFECTS FILTER FOR CAMERAS

(75) Inventors: Edward C. Glover, London; Nigel R. Wildman, Watford Herts, both of (GB); Marc J. Gaudillere, Saint-Remy (FR)

(73) Assignee: Eastman Kodak Company, Rochester, NY (US)

( * ) Notice: Under 35 U.S.C. 154(b), the term of this patent shall be extended for 0 days.

(21) Appl. No.: 09/282,732

(22) Filed: Mar. 31, 1999

(30) Foreign Application Priority Data

Jul. 13, 1998 (FR) .................................................. 98 09120

(51) Int. Cl.[7] ............................ G03B 11/00; G03B 17/00
(52) U.S. Cl. .............................. 396/544; 396/6; 396/373; 359/889; 359/892
(58) Field of Search ................................ 396/544, 6, 535, 396/529, 448, 439, 373; 359/889, 892, 502; 352/66

(56) References Cited

U.S. PATENT DOCUMENTS 3,882,517   5/1975   Land et al. .
4,063,266 * 12/1977   Thomas et al. ...................... 396/544

FOREIGN PATENT DOCUMENTS 8900426   5/1989   (DE) .

OTHER PUBLICATIONS

Derwent abstract of French patent document 2,441,186, printed Jan. 13, 1999.*
EPO "Patent Abstracts of Japan" abstract and 2 drawings of Japanese patent publication 58–198027, published Nov. 17, 1983.*
Derwent abstract of Japanese patent document J10282607, published Oct. 23, 1998.*

* cited by examiner

Primary Examiner—Alan A. Mathews
(74) Attorney, Agent, or Firm—Susan L. Parulski

(57) ABSTRACT

The special effects filter for camera comprises a transparent support sliding on the camera body between at least two positions. The support is fitted with at least one zone capable of covering the lens and the viewfinder of the camera so that practically identical light transmission characteristics are respectively registered with the lens and the viewfinder.

7 Claims, 3 Drawing Sheets

SPECIAL EFFECTS FILTER FOR CAMERAS

FIELD OF THE INVENTION

This invention relates to photography and in particular to a filter for modifying color rendition.

BACKGROUND OF THE INVENTION

It is usual to put filters in front of camera lenses to modify color rendition. The Patents FR 2 205 210 and FR 2 441 186 describe systems for holding filters in front of camera lenses. However, cameras using such filters are single lens reflex cameras.

It is the object of the invention to provide this technique to users of less cumbersome cameras available for the general public Such as single use cameras that are factory loaded.

SUMMARY OF THE INVENTION

This object of the invention is achieved with an adaptable special effects filter for cameras with a body fitted with a separate lens and viewfinder, which is characterized by a transparent support sliding on the camera body, between at least two positions, the filter being fitted with at least one zone capable of covering the lens and the viewfinder of the camera, when it is in at least one of the positions thereof, so that similar light transmission characteristics are arranged opposite the camera's lens and viewfinder.

These and other aspects, objects, features and advantages of the present invention will be more clearly understood and appreciated from a review of the following detailed description of the preferred embodiments and appended claims and by reference to the accompanying drawings.

DETAILED DESCRIPTION OF THE INVENTION

Figure 1:
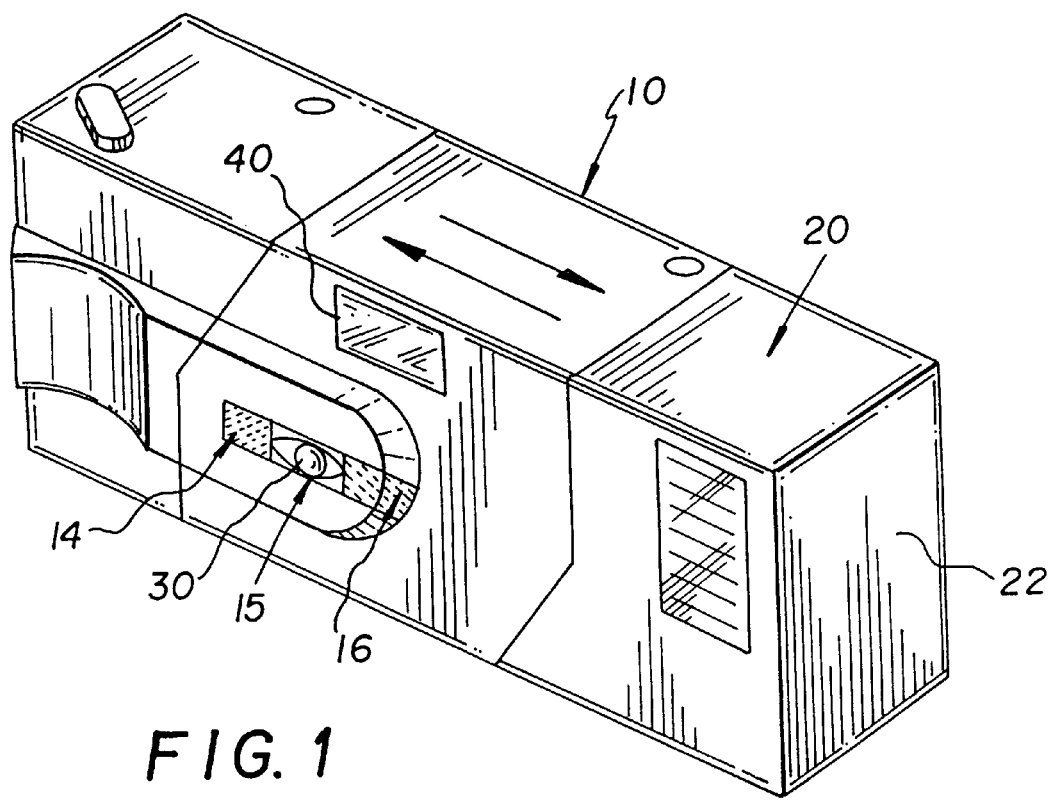
FIG. 1 represents in perspective the first embodiment of a filter according to the invention associated with a camera.

As can be seen in FIG. 1, the filter 10 according to the invention is adapted to a camera 20 which is factory loaded before selling. Such cameras are usually called "single use". This type of camera comprises a body 22 or box fitted with a lens 30 allowing the image to be formed on the photographic material arranged inside the box 22 and a viewfinder 40 separate from the lens allowing the user to frame the image to be recorded. Other components of the camera are not mentioned as they do not directly interact with the invention and they may take any form known to those skilled in the art. Clearly the camera can be fitted, as can be seen in FIG. 1, with a flash but the invention can also be used on cameras not having such lighting devices.

Figure 2:
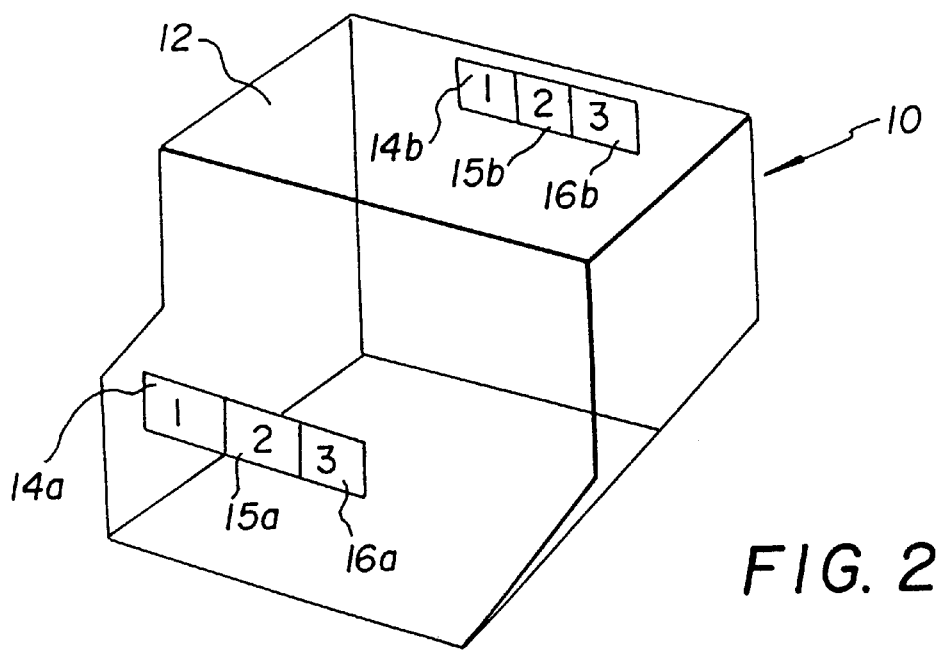
FIG. 2 represents in perspective the first embodiment of the filter according to the invention without the camera.
Figure 3:
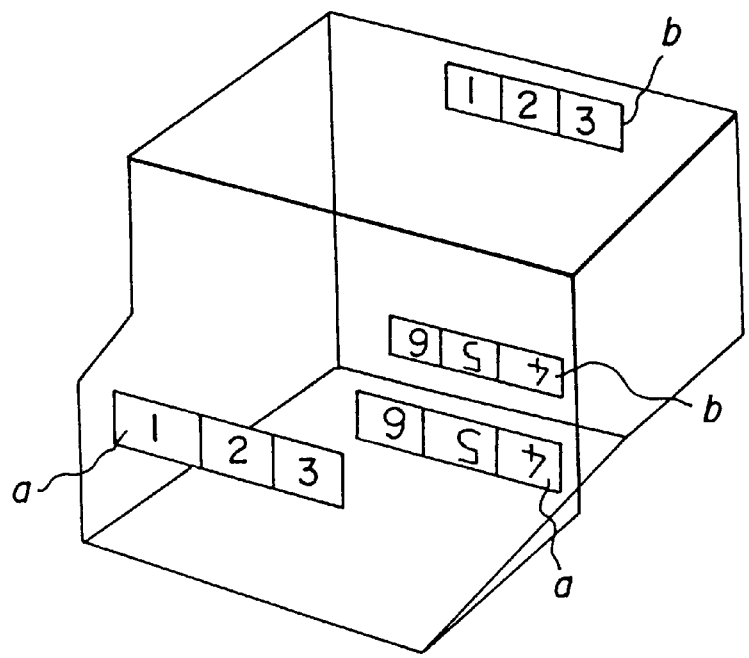
FIG. 3 represents in perspective a second embodiment of a filter according to the invention.
Figure 4:
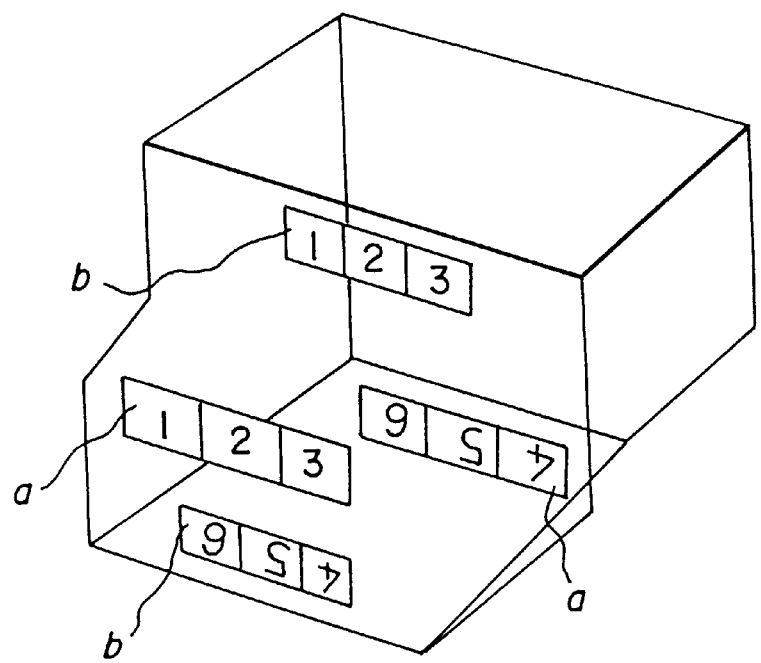
FIG. 4 represents in perspective a third embodiment of a filter according to the invention.

According to one embodiment of the invention, the filter 10, which is represented in greater detail in FIGS. 2 to 4, has the form of a transparent support 12 surrounding the body of the camera. In one embodiment, transparent support 12 has a ring shape (not shown). The support 12 is fitted with at least one zone 14, 15, 16 capable of covering the lens 30 and the viewfinder 40 of the camera. In one particular embodiment, each zone comprises two areas 14a, 14b, 15a, 15b, 16a, 16b each of whose positions is adapted so as to cover the camera's lens and the viewfinder respectively. For the areas corresponding to the same zone, the light transmission characteristics are practically identical. Clearly according to the respective positions of the camera lens and viewfinder the areas can be distant and separated one from another or be in contact with each other. Advantageously, the filter can take a position in which it does not cover either the lens or the viewfinder. However, a filter can also be used wherein the light transmission characteristics of one of the zones is neutral; that is for which the spectral composition of the light crossing it is not altered. In addition it is advantageous for the light transmittance value to be as close to 1 as possible.

In the rest of the description "a" will designate all the areas that can be put opposite the lens, and "b" all the areas that can be put opposite the viewfinder.

Figure 6:
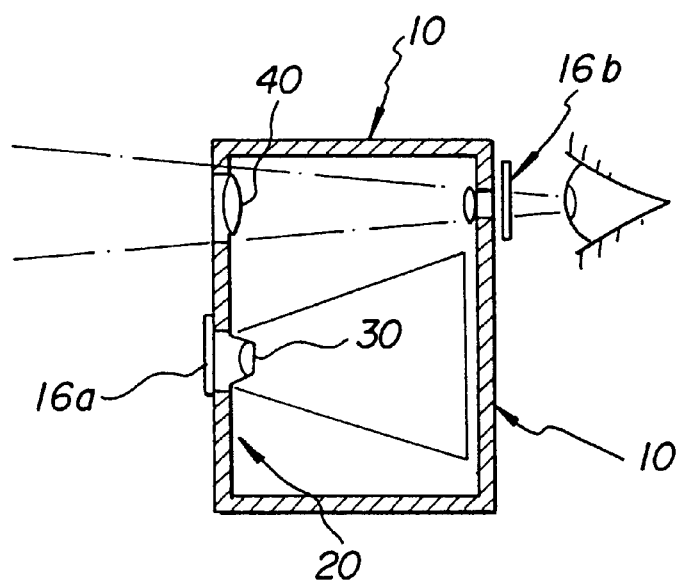
FIG. 6 represents diagrammatically in cross-section the filter arranged on the camera in use.

FIG. 6 represents a diagrammatic cross-section view of the filter 10 according to the invention arranged on a camera, and allows the operation of the invention to be understood more easily. As it is shown, when the operator uses the camera, he looks through the viewfinder 40 at the scene to be recorded. The dotted lines in FIG. 6 represent the angle of field that is to be recorded onto the photographic film. The lens 30 forms the image of the scene onto the photographic film arranged in the camera, in a way that is well known in photography. As previously indicated, the filter 10 surrounding the camera, for example, has an area 16a of the zone 16 arranged opposite the lens and an area 16b of the zone 16 arranged opposite the viewfinder. In this way the user can visually check the view that he will obtain after processing and printing.

In the embodiment of the invention represented in FIGS. 1 and 2 the filter 10 comprises three couples of areas, red, green and blue respectively. Clearly the three colors used can be cyan, magenta and yellow, or any other combination that the user desires. In the embodiment represented in FIGS. 1, 2, 3 and 6 the areas corresponding to the same zone are located on two separate faces of the filter; the "a" areas intended to be opposite the lens are located at the front of the filter, while the "b" areas intended to be opposite the viewfinder are located to the rear of the filter.

Clearly, according to the arrangement of the lens which is generally not centered by height in relation to the camera, the filter can be turned so that other areas of the filter are arranged opposite the lens and the viewfinder. This embodiment of the invention, for example, is represented in FIGS. 3 and 4. Such an artangement, for example, allows six different areas to be obtained. In one embodiment the zones have the colors green, red, blue, cyan, magenta and yellow respectively. They are shown diagrammatically in FIGS. 3 and 4 by the references 1 to 6.

Clearly neutral areas can be provided, whose transmittance allows the amount of light to be reduced thus making it possible to use a very sensitive film in a very bright environment.

In the embodiment of the invention represented in FIG. 4 the "a" and "b" zones are all arranged on the same face of the filter 10.

Figure 5:
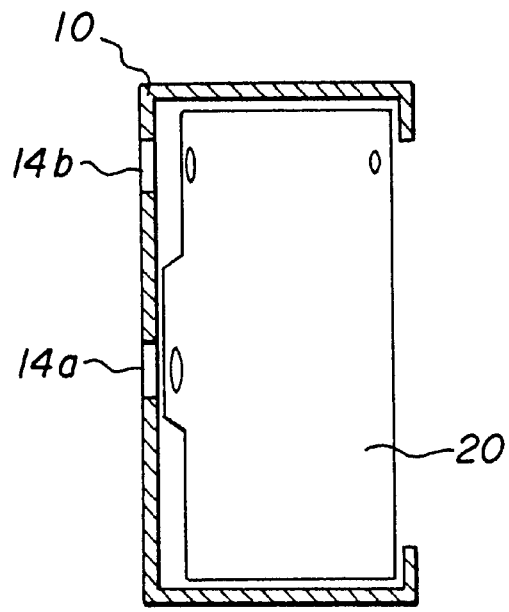
FIG. 5 represents in side view a fourth embodiment of a filter according to the invention.

In another embodiment, such as that represented in FIG. 5, the filter support is produced by molding a plastic material that is colored by a known method. As represented in FIG. 5, the filter is made in a rigid material and does not completely surround the camera. Clearly the camera can be provided with grooves on the upper and lower faces and the rigid support can be designed to work with these grooves so that the filter is held in position on the camera body.

In still another embodiment, the filter support which was used is a polyester such as a transparent polyethylene terephtalate, the thickness of which was 125 µm sold by ICI under the trade mark "Melinex". Colored zones were provided by organic dye inks such as those provided by Brancher Society, F-78143 VELIZY under trade mark "Jaune Yellow Centaure 26752A", "Bleu Reflex Centaure 26756A", "Bleu Process Centaure 24998A", "Rose Rhodamine Centaure 26755A", and "Rouge Warm Red Centaure 26753A".

The filter support printed flat was cutted and the two ends thus formed were attached together to form a ring designed to fit the camera body.

The attachment was provided with a double coated adhesive sticker. It is obvious that said attachment could also be provided by ultrasonic or HF frequencies, by a cement adapted to the material of the filter support or by any other appropriate means.

The invention has been described with reference to a preferred embodiment. However, it will be appreciated that variations and modifications can be effected by a person of ordinary skill in the art without departing from the scope of the invention.

PARTS LIST:
10 filter
12 transparent support
14 zone
14a area
14b area
15 zone
15a area
15b area
16 zone
16a area
16b area
20 camera
22 body
30 lens
40 viewfinder

What is claimed is:

1. A special effects filter for cameras having a body fitted with a lens and a viewfinder separated from one another, said special effects filter comprising: a transparent slidable support for movably supporting the filter, said slidable support adapted for sliding on the camera body between at least two positions; a plurality of light transmission zones fitted in said slidable support with at least one of said plurality of zones being coextensive with the camera lens and viewfinder when said slidable support is in at least one of the at least two positions, thereby enabling similar light transmission characteristics opposite the camera lens and viewfinder.

2. A filter according to claim 1 wherein said plurality of light transmission zones each has different light transmission characteristics from one another.

3. A filter according to claim 2 wherein each one of said plurality of light transmission zones comprises two areas arranged on the same practically plane surface of the slidable support.

4. A filter according to claim 2 wherein each one of said plurality of light transmission zones comprises two areas arranged on two separate practically plane faces of the support.

5. A filter according to claim 1 wherein the support is adapted for surrounding a camera at least partially.

6. A filter according to claim 1 wherein the transparent support is adapted to sliding to a position on a camera body where it is not covering the camera lens.

7. A filter according to claims 6 wherein the transparent support is a polyester.

* * * * *